(12) United States Patent
Mauduit et al.

(10) Patent No.: US 8,596,685 B2
(45) Date of Patent: Dec. 3, 2013

(54) MOTOR VEHICLE CHASSIS HAVING A PART FOR ATTACHING BODYWORK ELEMENTS AND ELECTRICAL CABLES TO THE CENTRAL FLOOR

(75) Inventors: Thomas Mauduit, Voisins le Bretonneux (FR); Pascal Tabuteau, Montigny le Bretonneux (FR); Guillaume Camus, Guyancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/811,808

(22) PCT Filed: Jul. 11, 2011

(86) PCT No.: PCT/FR2011/051645
§ 371 (c)(1),
(2), (4) Date: Apr. 4, 2013

(87) PCT Pub. No.: WO2012/010771
PCT Pub. Date: Jan. 26, 2012

(65) Prior Publication Data
US 2013/0187371 A1    Jul. 25, 2013

(30) Foreign Application Priority Data
Jul. 23, 2010    (FR) ...................................... 10 56044

(51) Int. Cl.
*B62D 21/00*    (2006.01)
(52) U.S. Cl.
USPC ........................ 280/781; 296/193.07; 296/204
(58) Field of Classification Search
USPC ............ 280/781; 180/65.21, 65.31; 296/1.08, 296/193.07, 203.1, 204
See application file for complete search history.

(56) References Cited

U.S. PATENT DOCUMENTS 4,898,419 A * 2/1990 Kenmochi et al. ............. 296/204
7,540,343 B2 * 6/2009 Nakashima et al. .......... 180/65.1
(Continued)

FOREIGN PATENT DOCUMENTS

DE    44 17 470    5/1995
DE    10 2007 062 254    6/2009

OTHER PUBLICATIONS

International Search Report Issued Oct. 14, 2011 in PCT/FR11/051645 Filed Jul. 11, 2011.

(Continued)

*Primary Examiner* — Paul N Dickson
*Assistant Examiner* — Timothy Wilhelm
(74) *Attorney, Agent, or Firm* — Oblon, Spivak, McClelland, Maier & Neustadt, L.L.P.

(57) ABSTRACT

A motor vehicle chassis including two side skirt lateral flanks comprising a horizontal portion. The motor vehicle chassis also includes a central floor situated between the two side skirt lateral flanks and including a horizontal main surface and horizontal secondary surfaces for attachment to the horizontal portion of the lateral flanks. The horizontal surfaces exhibit a height difference. The motor vehicle chassis also includes at least one fixing piece on each side of the central floor, between the horizontal main surface of the central floor and one of the side skirt lateral flanks. The at least one fixing piece includes two horizontal parts for fixing to the central floor, which are respectively fixed to the horizontal main surface and to a horizontal lateral surface of the central floor. One of the horizontal parts includes a first passage to accept a fixing lug of a bodywork element.

7 Claims, 2 Drawing Sheets

(56) References Cited

U.S. PATENT DOCUMENTS

Figure 1:
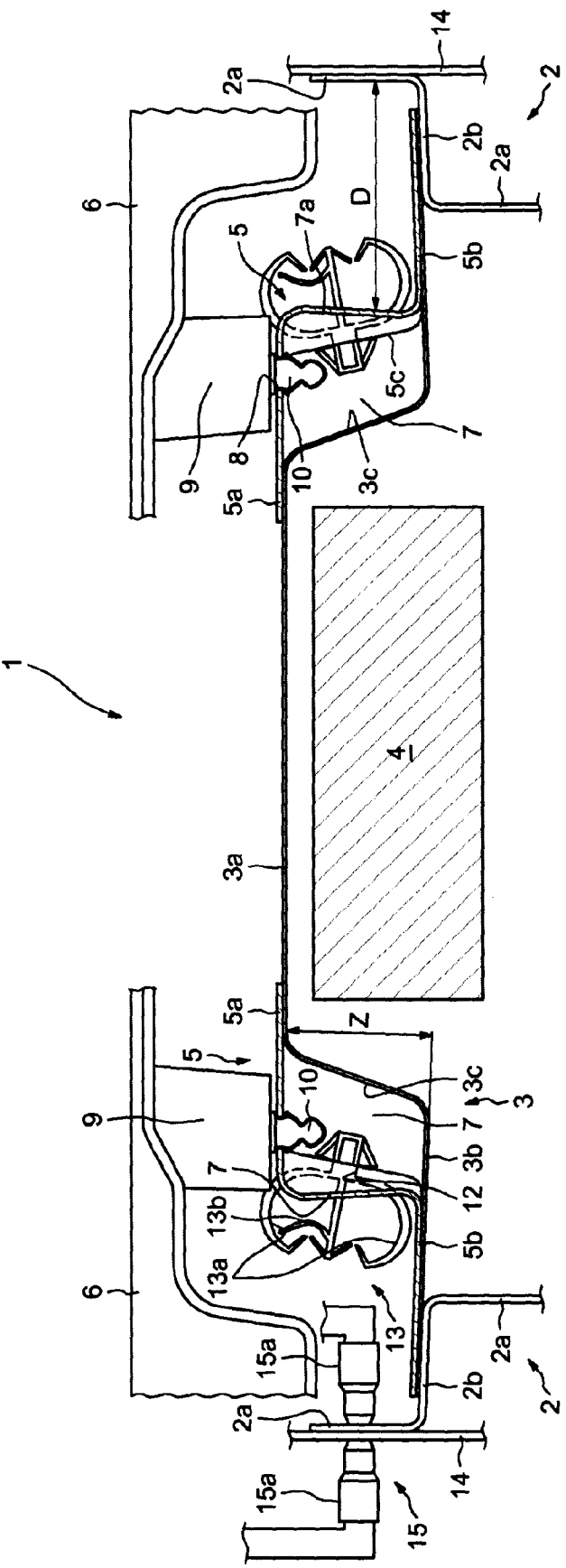

| | | | |
|---|---|---|---|
| 8,327,600 B2 * | 12/2012 | Stepan | 52/716.6 |
| 2009/0158687 A1 | 6/2009 | Stepan | |
| 2010/0213741 A1 * | 8/2010 | Suzuki et al. | 296/193.07 |
| 2011/0297467 A1 * | 12/2011 | Iwasa et al. | 180/65.31 |

OTHER PUBLICATIONS

U.S. Appl. No. 13/811,761, filed Mar. 12, 2013, Bisror, et al.
U.S. Appl. No. 13/811,777, filed Apr. 4, 2013, Tabuteau, et al.
U.S. Appl. No. 13/811,762, filed Apr. 2, 2013, Tabuteau, et al.
U.S. Appl. No. 13/811,750, filed Mar. 21, 2013, Bisror, et al.

* cited by examiner

MOTOR VEHICLE CHASSIS HAVING A PART FOR ATTACHING BODYWORK ELEMENTS AND ELECTRICAL CABLES TO THE CENTRAL FLOOR

The invention falls within the field of chassis for motor vehicles, notably electrically powered or hybrid vehicles. In order to ensure that the electrically powered or hybrid vehicles have sufficient range, accumulator batteries have to be carried on board. The volume of these batteries is significantly greater than the volume occupied by a traditional reserve of energy such as a fuel tank for example.

One solution is to make use of a volume delimited under the passenger seat, by modifying the profile of the floor in such a way as to isolate this volume from the passenger compartment. The passenger seat then rests directly on a raised region of the floor. The height of the seat may be the same as in vehicles of the same range built to be powered by a combustion engine, or may be higher.

In combustion-engine motor vehicles, the height of the central floor is below the height of the side skirt lateral flanks which means that the wiring, such as electrical cables for example, and bodywork elements are fixed directly to the lateral flanks.

By raising the central floor, the attachments for these elements need to be relocated which means that fixing directly to the side skirt lateral flanks is no longer an option. Finally, because the floor needs to remain sealed, fixing these elements directly to the floor is inconceivable because it would be necessary to drill directly into the central floor, which could also give rise to risks of corrosion of said central floor.

It is an object of the invention to propose a chassis for a motor vehicle or for another vehicle which requires a large volume energy reserve, that allows electrically powered vehicles to be produced in parallel with combustion engine powered vehicles using a high number of components and production means in common.

It is another object of the invention to propose such a chassis which offers a structure for attachment of bodywork elements and wiring without modifying the side skirt lateral flanks.

In one embodiment, the invention relates to a motor vehicle chassis comprising two side skirt lateral flanks comprising a horizontal portion, a central floor situated between the two side skirt lateral flanks and comprising a horizontal main surface and horizontal secondary surfaces for attachment to the horizontal portion of the lateral flanks, and a housing for a reserve of energy situated under the horizontal main surface of the central floor situated above said horizontal portions of the side skirt lateral flanks. The main surface of the central floor exhibiting a height difference because of the presence of the housing of a reserve of energy.

The motor vehicle chassis comprises, on each side of the central floor, between said horizontal main surface of the central floor and one of the side skirt lateral flanks, at least one fixing piece comprising two horizontal parts for fixing to the central floor, which are respectively fixed to the horizontal main surface and to a horizontal lateral surface of the central floor, one of said horizontal parts comprising a first passage to accept a fixing lug of a bodywork element.

The use of fixing pieces allows bodywork elements and electrical cables to be fixed to the chassis of the vehicle. Thus, the elements that make up a chassis for a combustion engine powered motor vehicle can be used without major modification on electrically-powered or hybrid vehicles the central floor of which is raised.

The fixing piece may comprise a vertical or inclined part connecting the two horizontal parts.

For preference, the fixing piece comprises stiffening means.

The fixing pieces may be made of bent sheet metal.

For preference, each fixing piece may comprise a second passage to accept a clip for securing electrical cables. Said second passage may be situated on the vertical or inclined part of said fixing piece.

Advantageously, the fixing pieces are fixed to the central floor in such a way as to leave a gap between the vertical or inclined part of the fixing piece and a vertical part of the corresponding side skirt lateral flank.

For preference, the bodywork element may be a door sill trim.

A "door sill trim" means any component generally made of rigid synthetic material used to cover the bottom part of the metal frame covering the door as far as the central floor so as to conceal any wiring and other elements. The door sill trim is then connected to a fabric covering the central floor. The door sill trim also constitutes a step on which a user can stand in order to reach the roof of the vehicle. For that reason, this trim needs to be strong enough to bear the weight of the user.

Figure 2:
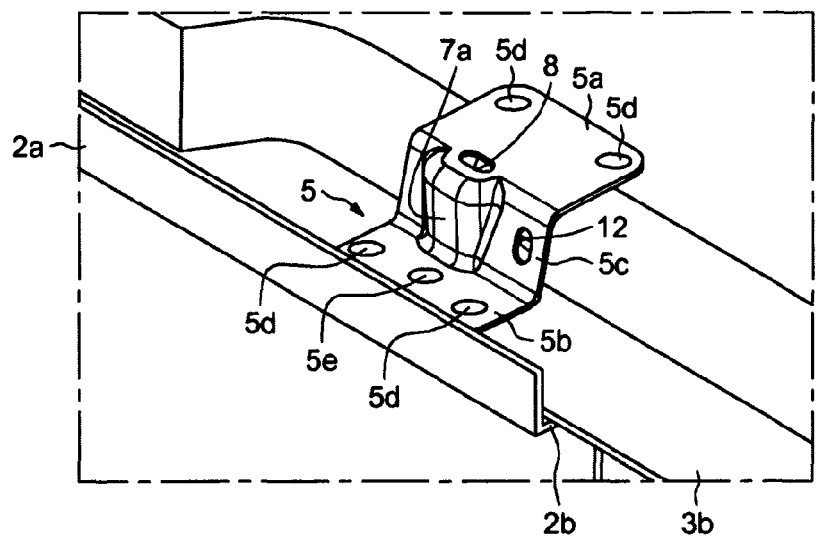
Figure 3:
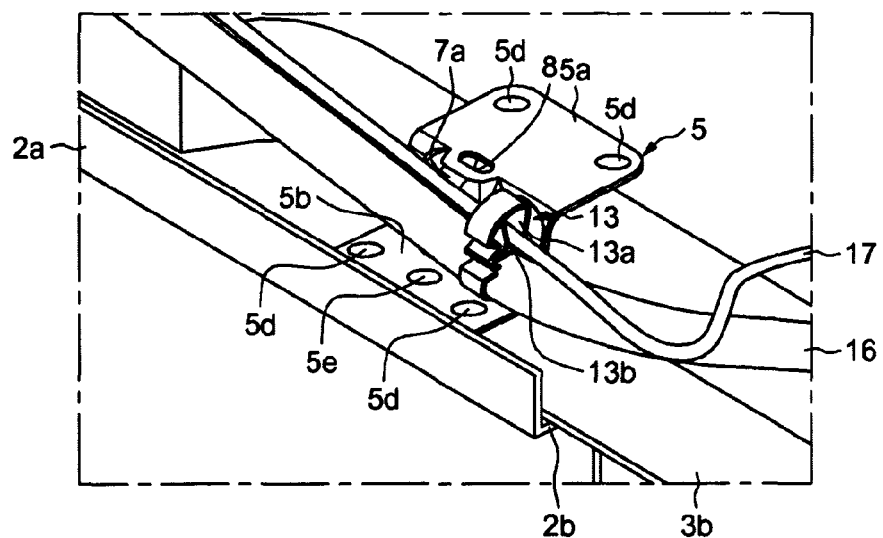

Other objects, features and advantages of the invention will become apparent from reading the following description, given solely by way of nonlimiting example and made with reference to the attached drawings in which:

FIG. 1 is a schematic view in cross section of part of a chassis according to the invention, FIG. 2 is a partial view of the chassis of FIG. 1 in perspective from above, and FIG. 3 is a partial view of the chassis of FIG. 1 in perspective from above illustrating the fixing of wiring.

As illustrated in FIG. 1, part of a chassis 1 is delimited laterally by two side skirt lateral flanks 2. What is meant by "chassis" is any assembly the overall shape of which is substantially parallelepipedal supporting the engine, the passenger compartment and the bodywork of a vehicle.

A side skirt lateral flank or skirt board, denotes the lateral parts of a motor vehicle intended to support the load.

Each side skirt lateral flank 2 comprises two vertical parts 2a joined together by a horizontal portion 2b for the fixing of a central floor 3. The side skirt lateral flanks 2 may be made of bent or pressed sheet metal. The central floor 3 comprises a horizontal main surface 3a and horizontal secondary surfaces 3b for fixing the central floor 3 to the horizontal portion 2b of the side skirt lateral flanks 2. The horizontal surfaces 3a and 3b have a height difference Z caused by the fact that a housing is formed under the central floor 3 to accommodate accumulator batteries 4. Thus, the horizontal main surface 3a of the central floor 3 is above the horizontal portions 2b of the side skirt lateral flanks 2.

Fixing pieces 5 are mounted on each side of the central floor 3, between the horizontal main surface 3a of the central floor 3 and one of the side skirt lateral flanks 2, so as to leave a gap D between the fixing pieces 5 and the horizontal portions 2b of the side skirt lateral flanks 2. These fixing pieces 5 also allow the fixing of bodywork elements such as, for example, a door sill trim 6 and electrical cables 16, 17 illustrated in FIG. 3.

The door sill trim 6 is a component, generally made of a synthetic material, covering the bottom part of the metal frame covering the door (not depicted) as far as the central floor 3, so as to conceal the wiring that the vehicle needs. Each door frame of the vehicle comprises a door seal trim. In five-door vehicles, the four passenger doors each comprise a door sill trim. The door sill trim 6 is then connected to fabric (not depicted) with which the central floor 3 is covered. The door sill trim 6 also constitutes a step on which the user can stand in order to reach the roof of the vehicle. It will be noted that each fixing piece 5 may serve to fix other bodywork elements not located in the region of the doors of the vehicle.

Each fixing piece 5 is made of bent sheet metal and comprises two horizontal parts 5a, 5b connected by a part 5c. In the example illustrated, the part 5c is substantially vertical so that it makes a right angle with the horizontal parts 5a, 5b. As an alternative, the part 5c could be slightly inclined. The horizontal parts 5a, 5b of each fixing piece 5 are fixed respectively to the horizontal main surface 3a and to a horizontal secondary surface 3b of the central floor 3.

The part 5c of each fixing piece 5 is separated from a slightly inclined flank 3c which connects the horizontal main surface 3a to the horizontal secondary surfaces 3b. An empty space 7 therefore remains between each fixing piece 5 and the flank 3c of the central floor 3.

In the example illustrated, the vertical or inclined part 5c of the fixing piece 5 has a stiffening region 7a to enhance the stiffness of said fixing piece 5. The stiffening region 7a may be created by pressing the sheet outward in the horizontal plane.

As illustrated, the fixing piece 5 comprises, on its horizontal part 5a, a first passage 8 of oblong shape designed to accept a component for fixing the door sill trim 6, to the central floor 3. The first passage 8 is advantageously situated above the stiffening region 7a so as to prevent the fixing piece 5 from deforming under the weight of a user when the user stands on the door sill trim 6.

A fixing lug 9, incorporated into the trim of one of the door sills 6, comprises a stud 10 of elastic material capable of clipping into the passage 8 of the fixing piece 5. When the stud 10 is inserted into the first passage 8, the elastic stud 10 deforms, then reverts to its initial shape to constitute a retaining stop that holds the fixing lug 9 in the passage 8. The stud 10 may be made of a semirigid synthetic material or of a metallic material. After the stud 10 has been inserted into the passage 8, the stud 10 projects into the empty space 7.

The fixing piece 5 further comprises, on the vertical inclined part 5c, a second passage 12 of oblong shape designed to accept a securing clip 13. The securing clip 13 can thus project into the empty space 7. The securing clip 13 comprises two semicylindrical annular portions 13a for accepting electrical cables and a tab 13b extending into one of the semicylindrical portions 13a so that small-diameter electrical cables passing through at the passages defined by the semicylindrical portions 13a can be held in position. The lugs and the securing clips 9 and 13 are used in the way that is customary on motor vehicles and will not be described further hereinafter.

The first and second passages 8 and 12 may have the shape of an oblong hole as illustrated in the figures, to make fitting the fixing lugs 9 and 13 easier. It will be noted that such passages 8, 12 could have any other shape so that they can accept the fixing lugs 9, 13.

Once the chassis 1 has been assembled, the side skirt lateral flanks 2 are welded to the bodywork 14 of the vehicle. Because of how the fixing pieces 5 are positioned in relation to the side skirt lateral flanks 2, a gap D is left between the vertical or inclined part 5c of the fixing piece 5 and the vertical part 2a of the side skirt lateral flank so as to allow a welding device 15 depicted very schematically in FIG. 1 to be inserted. The welding device 15 may for example comprise a welding head and allow the vertical part 2a to be welded to the bodywork 14 of the vehicle.

FIG. 2 illustrates a perspective partial view of part of the chassis 1 of FIG. 1.

As illustrated in FIG. 2, a fixing piece 5 is fixed by spot welds 5d via the horizontal part 5a to the horizontal main surface 3a of the central floor 3 and via the horizontal part 5b to one of the horizontal secondary surfaces 3b of the central floor 3. In order to preassemble and strengthen the fixing of the horizontal part 5b of the fixing piece 5 to the horizontal lateral surface 3b of the central floor 3, it is conceivable to effect an additional fixing using a rivet 5e.

When the fixing pieces 5 have been fixed to the central floor 3, the securing clips 13 may be mounted on the vertical or inclined part 5c of each fixing piece 5 by insertion into the passage 12, as illustrated in FIGS. 1 and 3.

As illustrated in FIG. 3, the semicylindrical portions 13a of the securing clips 13 are able to accept electrical cables 16 and 17 and hold them in position. The fixing clips 13 are made of synthetic material so that they can adapt to suit cables of different diameters. Thanks to the tab 13b situated on the inside of the semicylindrical portions 13a, small-diameter cables 17 can be held in the clips 13. The securing clips 13 can be used for securing electrical cables 16, 17 along and on each side of the central floor 3.

Assembly of the chassis 1 involves first of all fixing the central floor 3 to the side skirt lateral flanks 2a. The fixing pieces 5 then need to be fixed to the central floor 3, for example by welding and/or by riveting, as illustrated in FIG. 2.

When the fixing pieces 5 have been fixed to the central floor 3, the side skirt lateral flanks 2 can be fixed to the bodywork 14 of the vehicle using the welding device 15. The welding device 15 may consist of a two-branch welding head the two branches 15a of which are positioned one on each side of the two portions of sheet metal 2a and 14 that respectively form part of the chassis 1 and of the bodywork of the vehicle. One of the branches of the head 15a is situated on the outside of the bodywork 14. The other branch of the head 15a may pass between the vertical part 2a of the side skirt lateral flank 2 and the fixing piece or pieces 5 situated on the same side thanks to the gap D that remains between the fixing pieces 5 and the vertical part 2a of the side skirt lateral flank 2. In an advantageous alternative form of the method of assembling the chassis 1, the fixing pieces 5 are fixed to the central floor 3 after the side skirt lateral flanks 2 have been fixed to the bodywork 14. Thus, with reference to FIG. 1, the gap D is increased; it extends between the vertical part 2a of the side skirt lateral flank 2 and the flank 3c of the central floor 3. This then provides a larger gap D for the passage of the welding device 15.

Thanks to the invention that has just been described, the fixing pieces can be used for fixing bodywork elements, such as the door sill trim, to a raised floor.

Despite the raised position of the floor, it is possible to fix the door sill trim and the wiring on each side of the raised floor. In addition, the invention makes it possible to avoid the problems of sealing and corrosion of the central floor which might be caused by drillings for fixing bodywork elements and electrical cables directly to the central floor.

The addition of a fixing piece at each vehicle door for fixing door trims or at other points between the central floor and the side skirt lateral flanks makes it possible to overcome this difficulty while at the same time improving the overall stiffness thanks to the additional stiffness afforded by the presence of the fixing pieces. The shape and position of these fixing pieces also make it possible to maintain a welded connection between the central floor and the side skirt lateral flanks.

In addition, the elements that make up the chassis of a combustion engine powered motor vehicle can be used without major modification on electrically-powered or hybrid vehicles the central floor of which is raised.

Thus, one and the same automatic assembly line can be used to produce electrically-powered vehicles and combustion engine powered vehicles.

The invention claimed is:

1. A motor vehicle chassis, comprising
   two side skirt lateral flanks comprising a horizontal portion;
   a central floor situated between the two side skirt lateral flanks and comprising a horizontal main surface and horizontal secondary surfaces for attachment to the horizontal portion of the lateral flanks, said horizontal surfaces exhibiting a height difference, and a housing for a reserve of energy situated under the horizontal main surface of the central floor situated above said horizontal portions of the side skirt lateral flanks; and
   at least one fixing piece on each side of the central floor, between said horizontal main surface of the central floor and one of the side skirt lateral flanks, the at least one fixing piece comprising two horizontal parts for fixing to the central floor, which are respectively fixed to the horizontal main surface and to a horizontal lateral surface of the central floor, one of said horizontal parts comprising a first passage to accept a fixing lug of a bodywork element.

2. The chassis as claimed in claim 1, in which the fixing piece comprises a vertical or inclined part connecting the two horizontal parts.

3. The chassis as claimed in claim 2, in which each fixing piece comprises a second passage to accept a clip for securing electrical cables, said second passage being situated on the vertical or inclined part of said fixing piece.

4. The chassis as claimed in claim 2, in which the fixing pieces are fixed to the central floor in such a way as to leave a gap between the vertical or inclined part of the fixing piece and a vertical part of the corresponding side skirt lateral flank.

5. The chassis as claimed in claim 1, in which the fixing piece comprises stiffening means.

6. The chassis as claimed in claim 1, in which the fixing piece is made of sheet metal.

7. The chassis as claimed in claim 1, in which the bodywork element is a door sill trim.

* * * * *